UNITED STATES PATENT OFFICE.

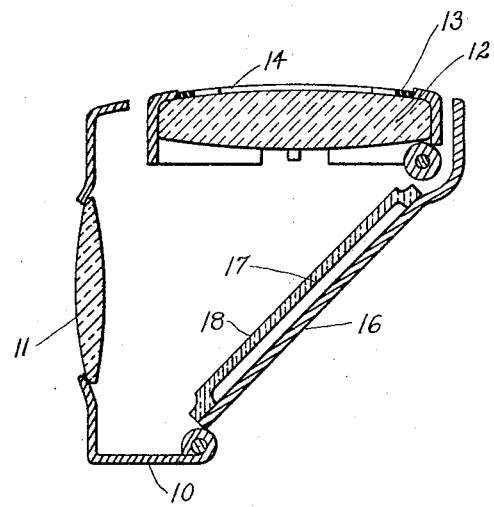
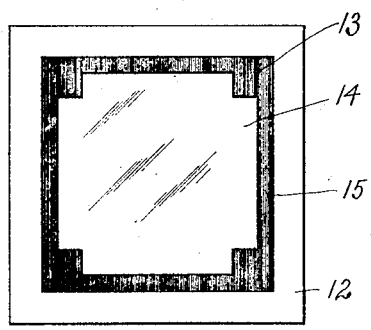
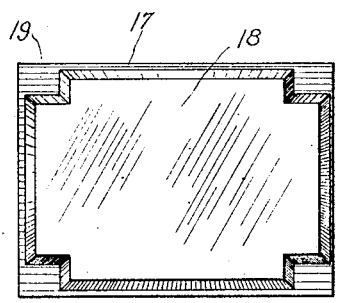
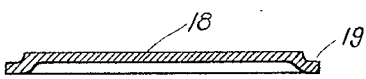
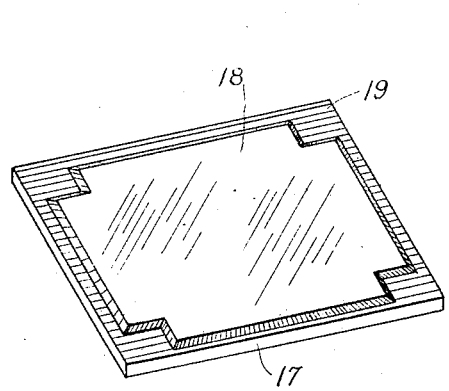

RALPH CLIFTON PATTON, OF PROVIDENCE, RHODE ISLAND.

VIEW-FINDER.

1,331,363. Specification of Letters Patent. Patented Feb. 17, 1920.

Application filed November 29, 1919. Serial No. 341,434.

*To all whom it may concern:*

Be it known that I, RALPH C. PATTON, a citizen of the United States, and resident of the city of Providence, in the county of Providence and State of Rhode Island, have invented certain new and useful Improvements in View-Finders, of which the following is a specification.

This invention relates to improvements in view finders for photographic cameras, and has for its object to provide an improved view finder which will assist the user in placing his eye properly with respect to the finder in order that he may direct the camera with accuracy toward the object desired.

A further object of this invention is to provide an improved form of mirror in which the reflecting surface has a definite outline surrounded by a non-reflecting surface depressed below the plane of the reflecting surface.

With these and other objects in view, the invention consists of certain novel features of construction, as will be more fully described, and particularly pointed out in the appended claims.

In the accompanying drawings:

Figure 1—is a sectional side elevation showing a foldable form of view finder with my improved sighting device attached thereto.

Fig. 2—is a plan view showing a detail of the finder lens with a mask for providing a definite outline to the sighting area.

Fig. 3—is a face view of the mirror, showing the general arrangement of the definite angular outline in such form as to appear to coincide with the outline of the mask when the mirror is set at its proper angle and is seen through the lens.

Fig. 4—is a central sectional edge view through the mirror plate.

Fig. 5—is a perspective view of the mirror plate, showing the background depressed below the polished surface thereof.

It is found in practice that it is difficult to sight a camera accurately by means of the so-called "brilliant" type of view finder because the finder shows the image in a distorted position when the user places his eye in any position other than in line with the proper optical axis of the finder.

To correct this objection to the use of a view finder of this character, and to render it easy to sight the camera correctly, I have provided coöperating determining means, one located on the top lens and the other upon the mirror, which when positioned so that they appear to coincide with each other, signify that the camera is in correct alinement for taking a picture.

The following is a detailed description of one means by which this result may be accomplished. In the drawings I have illustrated a view finder showing one embodiment of my invention, the finder however is not shown mounted on the camera on which it is designed to operate, but the finder may be attached to the camera at any convenient point with the axis of its front lens parallel with that of the camera lens.

With reference to the drawings, 10 designates a suitable frame in which the parts of the finder are mounted to permit these parts to be folded when desired, in the usual way.

Mounted in the upper portion of this frame is the top lens 12 preferably of the "brilliant" type, which has many advantages over the old ground glass plate. Over this lens I have mounted an opaque mask or frame 13 whose middle portion is cut out, as at 14, forming an opening with an angular boundary through which the view to be photographed may be observed within the definite angular outline.

Instead of using a separate mask or frame to surround the optically useful central portion of the top lens, the rim of the lens itself may be ground, painted, or otherwise rendered opaque or translucent; or the lens may be provided with one or more designating lines or marks upon its surface, in which case such line or mark would take the place of the boundary which would otherwise be furnished by the mask.

Mounted on the angle plate 16 below this top lens 12, is a mirror 17 which is preferably formed of metal having a polished surface 18 whose outline is of such a shape as to appear to register or coincide with that of the opening through the mask on the top lens, when the point of vision is substantially in alinement with the optical axis of this lens, and when the mirror is seen through the lens.

In constructing this mirror of metal it is found of advantage to form it of sheet metal in which the surface to be polished is raised by means of swaging dies, or otherwise, from the background 19 thereof, so that the finishing or polishing action on the mirror, acts only upon that portion which is within the angular outline, the background 19 being left dull or further treated to remove its reflecting qualities.

I do not wish to be restricted to the forming of this mirror of metal as it may be made of glass or any other suitable material; neither do I wish to be restricted to forming a definite continuous coöperating boundary line on the mirror member, as in some cases the face of the mirror may be provided with one or more distinguishing lines or marks upon its surface, arranged to coöperate with the distinguishing means on the top lens to assist in sighting the camera.

By the use of my improved view finder the camera may be positioned very quickly and with great accuracy even by an unskilled operator.

The device is extremely simple and inexpensive in construction, and is effective in operation.

The foregoing description refers solely to the construction illustrated, but I desire it to be understood that I reserve the privilege of resorting to all the mechanical changes to which the device is susceptible, the invention being defined and limited only by the appended claims.

I claim:

1. In a view finder, a lens, a mirror and coöperating distinguishing means on both said lens and mirror, which means appear to coincide substantially with each other when the mirror is seen through the lens from a point substantially on the optical axis of the lens.

2. In a view finder, a lens having a definite outline, a coöperating mirror also having a definite outline so arranged as to appear to substantially coincide with that of the lens when the mirror is seen through the lens from a point substantially on the optical axis of said lens.

3. A view finder comprising a lens having a definite outline, a mirror having a definite outline, arranged so that the outline of the mirror appears to coincide substantially with the outline of the lens when the mirror is seen through the lens from a point substantially on the optical axis of the lens, the background about the mirror being below the reflecting surface thereof.

4. A view finder comprising a frame, a front lens and a top lens in said frame, a mask having a definitely outlined angular opening on said top lens, a mirror set at an angle relative to said top lens and having a polished portion raised above a dull background, said raised portion being in definite outline arranged to appear to register with that of said top lens when the point of vision is properly located above said top lens.

In testimony whereof I affix my signature.

RALPH CLIFTON PATTON.